United States Patent [19] [11] 4,033,574
Stange et al. [45] July 5, 1977

[54] DOCUMENT HANDLING APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[22] Filed: Nov. 28, 1975

[21] Appl. No.: 635,998

[52] U.S. Cl. .................................. 271/3; 271/195; 271/236
[51] Int. Cl.² .......................................... B65H 29/24
[58] Field of Search ............... 271/194, 195, 236, 3

[56] References Cited

UNITED STATES PATENTS

| 3,411,772 | 11/1968 | Rovin | 271/236 |
| 3,588,096 | 6/1971 | Leiter | 271/236 |
| 3,624,807 | 11/1971 | Schwebel | 271/236 |
| 3,834,799 | 9/1974 | Blosser | 271/195 X |
| 3,926,426 | 12/1975 | Toriumi | 271/236 X |

Primary Examiner—Richard A. Schacher
Attorney, Agent, or Firm—Carlos Nieves; James J. Ralabate

[57] ABSTRACT

Embodiments of apparatus for fluidically registering or posing documents in copying systems are disclosed. Each embodiment includes: a document feeder; and fluidic means for registering documents at a station and for discharging documents from the station. Discharged documents are collected in a tray.

12 Claims, 10 Drawing Figures

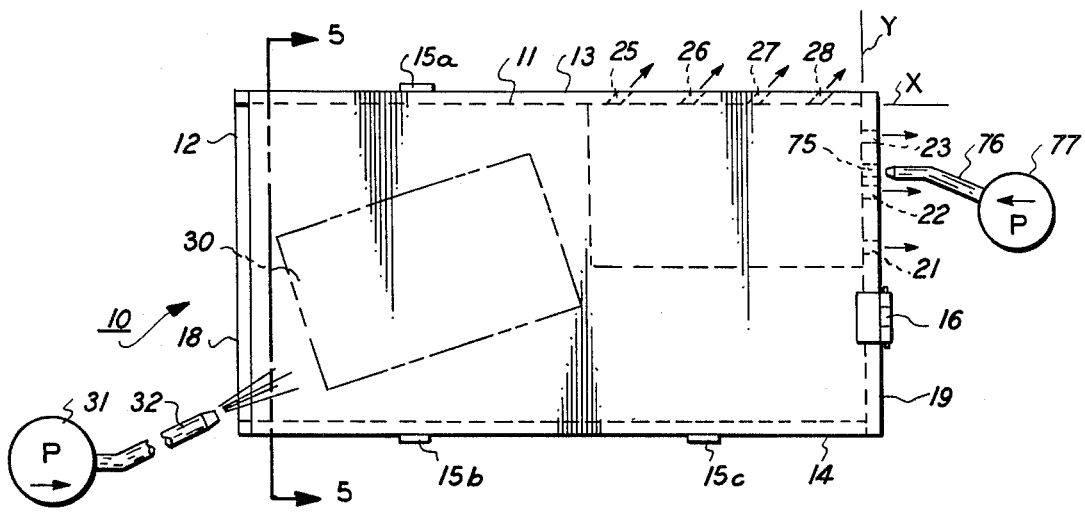
FIG. 4
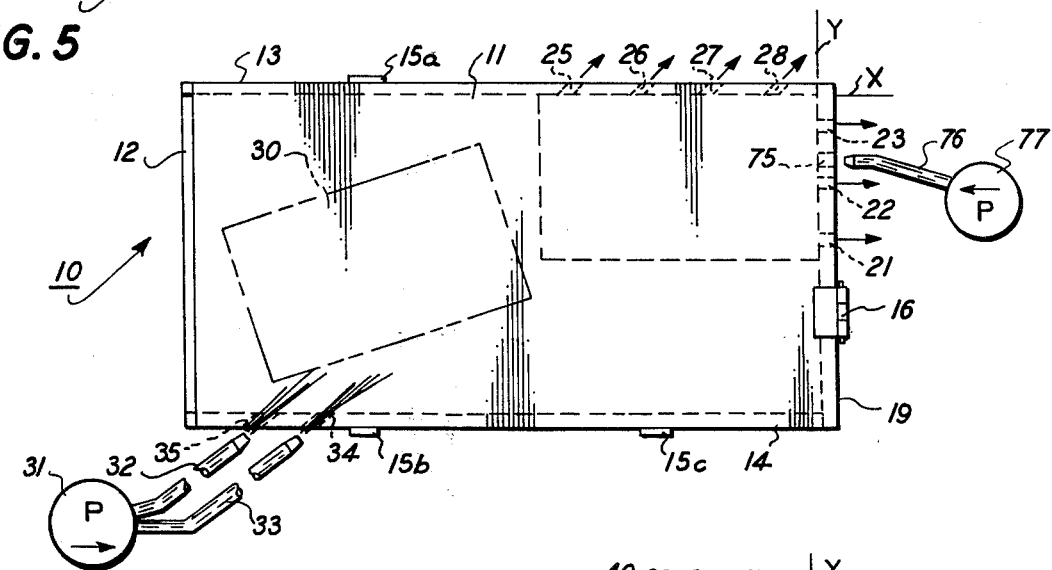
FIG. 5
FIG. 6
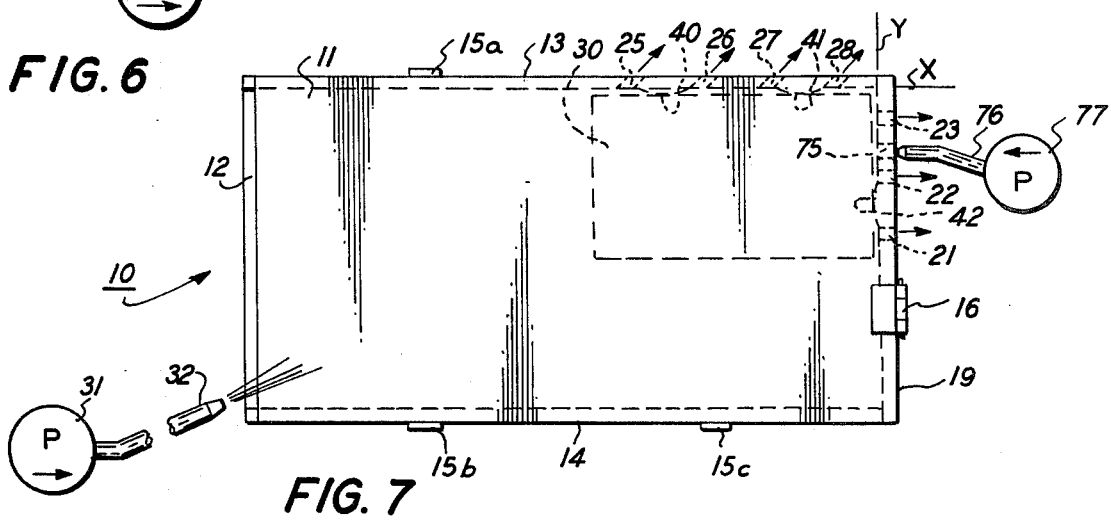
FIG. 7

DOCUMENT HANDLING APPARATUS

The subject invention generally relates to apparatus for posing documents at a station, such as the platen on which original documents are placed in xerographic copiers or duplicators, and to transports used to register articles carried thereby, such as disclosed in co-pending U.S. patent application Ser. No. 627,571, Pneumatic Registration Apparatus, filed on Oct. 31, 1975, on an invention by Klaus K. Stange, the application being assigned to the assignee herein, Xerox Corporation.

As is well know to those familiar with commercial xerographic copiers, copies of documents may be made by placing an original with an image to be copied in contact with a platen, by placing a cover over the located document and platen, and by actuating a button which initiates a machine cycle to produce a copy. In the machine process, a light image of the original is projected onto a charged photoconductive surface to produce a charge image and, subsequently, the charge image is developed with toner. The resulting toner image is thereafter transferred to copy paper and fused, the location of the fused image on the copy paper being dependent on the location of the original document on the platen. Because of this dependency, when it is desired that the location of a fused image on a copy correspond to the location of information on an original document, such document must be located precisely on a predetermined area of the platen. Obviously, this is a time-consuming operation. When it is desired to make copies of a plurality of documents, the cover must be lifted at least once for the substitution of documents on the platen, and this can be a tiring operation for a machine operator.

It is an object of the present invention to provide apparatus for automatically posing or registering documents at a station.

It is another object of the present invention to provide apparatus wherein documents are automatically fed, posed, and discharged.

A still further object of the present invention is to provide document handling apparatus useful with optical systems such as used in xerography to provide light images on photoconductive members.

Briefly, the invention disclosed herein may be used for posing documents at a station. Structurally, the invention may be implemented with (a) means for feeding documents; (b) fluidic means for receiving and registering said documents at the station and for discharging documents from the station; and (c) means for collecting discharged documets.

Apparatus built according to the invention may be used to register flimsy documents such as those produced on thin paper. Advantageously, loose particles undesirably located on either side of the documents are fluidically removed from the documents in the posing or registration process.

Additional objects and features of the invention will become apparent by reference to the following description in conjunction with the accompanying drawings, in which:

FIG. 4 is a schematic and top plan view of fluidic registration apparatus, according to the invention, a document being shown in a sleeve of the apparatus in an unregistered position (dot-dash lines) and in a registered position;

FIG. 5 is a cross-sectional view of the sleeve, taken along line 5—5 in FIG. ;

FIG. 6 is a schematic and top plan view of another embodiment of fluidic registration apparatus, according to the invention, a document being shown in a sleeve of the apparatus in an unregistered position (dot-dash line) and in a registered position;

FIG. 7 is a schematic and top view of still another embodiment of fluidic registration apparatus, according to the invention, a sheet being shown in a sleeve of the apparatus in a registered position;

Figure 1:
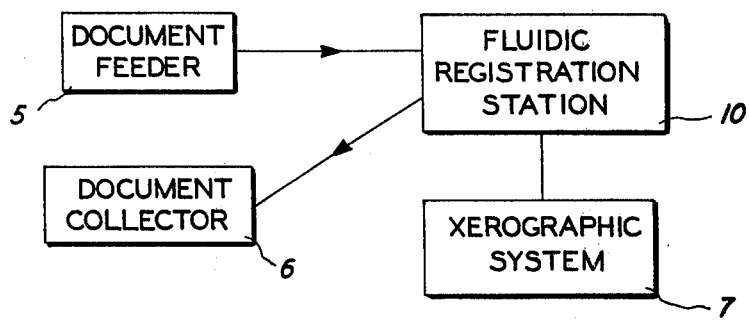
FIG. 1 is a block diagram of a xerographic system having, according to the invention, apparatus for posing documents at a station.

A system in which the subject invention is incorporated is schematically represented in FIG. 1. Operatively, during a cycle of the system, a document feeder 5 provides a document to a fluidic registration station 10 and the document is posed so that a xerographic system 7 can make a copy of the document. Thereafter, the registration station discharges the document to a document collector 6 which, as shown in FIGS. 2 and 3, may be a tray 8.

Figure 2:
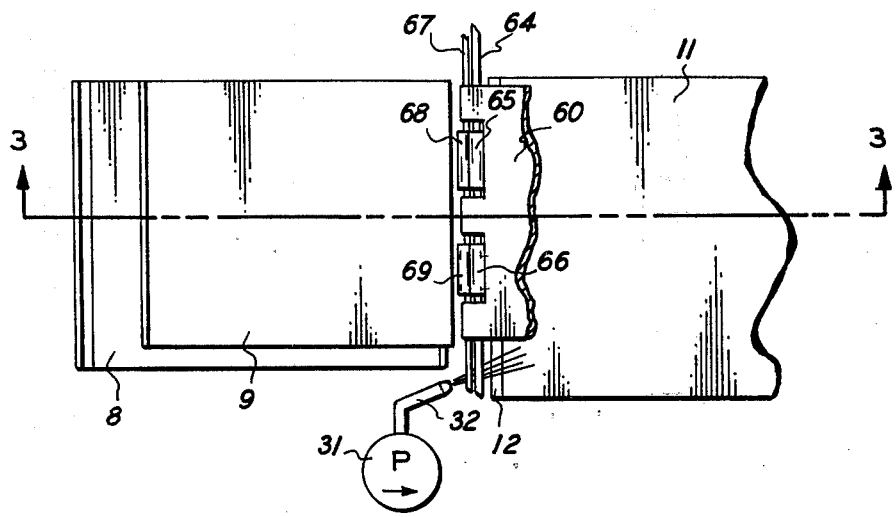
FIG. 2 is a partial top view of apparatus for posing documents.
Figure 3:
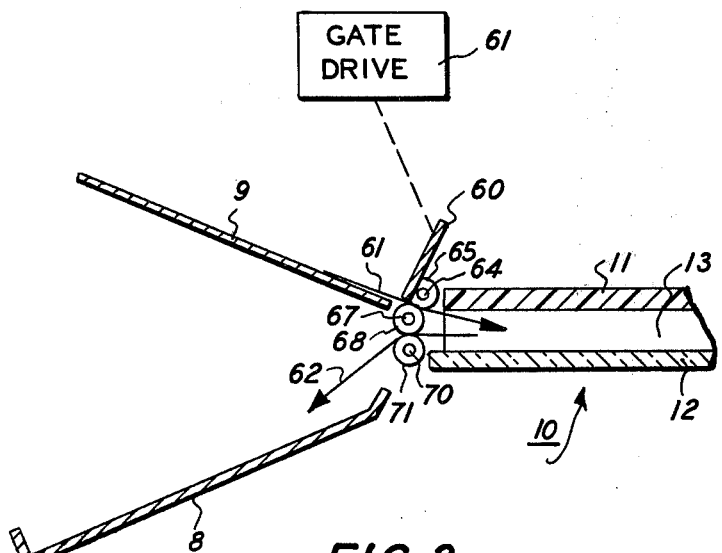
FIG. 3 is a cross-sectional view of the apparatus for posing documents, taken along line 3—3 in FIG. 2.

Referring to FIGS. 2 and 3, the document feeder may include an input tray 9, a movable gate 60, a gate drive 61 for moving the gate from an open to a close position, and a roller arrangement for moving documents, as is indicated by arrow 61, from the input tray to a fluidic registration apparatus 10. During this movement, gate 60 is open. When a document in the registration apparatus is discharged, it is engaged by the roller arrangement and follows the path indicated by arrow 62. The roller arrangement includes a driven rod 67 on which a pair of rollers 68 and 69 are secured and a fixed rod 64 on which a pair of idler rollers 65 and 66 are rotatably mounted, rollers 65 and 66 cooperating with rollers 68 and 69, respectively, to provide nips for feeding documents. Further, the roller arrangement includes a fixed rod 70 on which a pair of idler rollers 71 (only one shown) cooperate with rollers 68 and 69 to provide nips for discharging documents moving out of the fluidic registration apparatus 10. From the foregoing, it will be appreciated that only one source (not shown) is required to power the roller arrangement. Other document feeders may be used within the spirit of the invention. For example, U.S. Pat. No. 3,768,803, issued on Oct. 30, 1973, on an invention by K. K. Stange, sets forth sheet feeders which may be used to automatically feed documents, it being understood that the feed rate must be such as to allow engagemet of a sheet being discharged from the registration apparatus 10 with rollers 68, 69, and 71 before another sheet is fed in.

Fluidic registration apparatus 10 is more specifically shown in FIGS. 4 and 5. Typically, the apparatus includes a rectangular transparent plate 12 and a pair of spaced elongated rectangular members 13 and 14. Each of the members 13 and 14 extends from one narrow end of the plate, along a longitudinal end section, and abuts, at the other of its ends, a stop 19 extending along a section at the other narrow end of the plate. Brackets, only some of which are shown (15a–15d), secure the stop and elongated members 13 and 14 to plate 12. On top of the members 13 and 14 and stop 19 there is located a flexible plate which is pivotally connected by hinge 16 to stop 19. Plate 11 is sufficiently rigid to rest in parallel with plate 12 and is movable with respect thereto to provide, when desired, access to plate 12. When plate 11 is resting, the plates and elongated members provided a sleeve, at one end of which stop 19 is located. Stop 19 includes a plurality of ports 21–23 communicating with the space in the sleeve, and elongated member 13 includes a plurality of ports 25–28 communicating with the space in the sleeve, the ports in the stop and sleeve being located adjacent a common corner. The plate 12, the elongated members, and the stop are assembled in a fluid tight manner so that fluid entering through the open end of the sleeve moves towards the common corner and exits through the ports. Stop 19 is perpendicularly disposed with regard to the elongated members and, therefore, the common corner may be aligned with X and Y axes. In this embodiment, the top and bottom plates are spaced from each other by approximately one-sixteenth of an inch, and a document 30 which is smaller than the length and width of the space in the sleeve may be inserted therein by the document feeder 5 as is indicated by the dotted lines. If, thereafter, a pump 31 and nozzle 32 direct fluid into the open end of the sleeve, the fluid flow through the sleeve will move the document into registration at the common corner. After the document 30 moves into registration, it is considered to be posed for the optical system of the xerographic system and copies produced thereby on sheets of paper having the same dimensions as the registered document will have images located in correspondence with information on the document. To move the document out of registration pump 31 may be turned off and a fluid stream may be injected into the sleeve through a hole 75 in the stop 19 with a nozzle 76 and pump 77. As previously indicated, documents moved out of registration are engaged by rollers which deposit the documents into a tray 8 (see FIG. 3). It should be noted that when documents are fed periodically the pumps 31 and 77 may be actuated in synchronism with the feed rate to make sure that a document is fed only after a preceeding document has been engaged for discharge by rollers. Plate 11 has been pivotally connected so that if a copy of an unregistered document is desired, it can be readily placed against plate 12. Further, this arrangement allows copying from books and provides access to plate 12 for cleaning.

The registration apparatus disclosed above may be modified or supplemented in a number of ways, some of which are set forth below. In describing the various embodiments similar reference numerals will be used to designate components previously described.

Referring to FIGS. 4 and 6, it may be seen that the registration apparatus shown in FIG. 6 differs from that shown in FIG. 3 only in that ports 34 and 35 communicating with the sleeve are located on the elongated member 14 in an area adjacent the open end of the sleeve and that an additional nozzle 33 has been coupled to the pump. The nozzles are used to inject fluid through the ports in the elongated member for moving a document 30 inserted into the sleeve into a registered position. Although not shown, it will be appreciated by thosv skilled in the art that the nozzles may be replaced by a manifold coupling the pump 31 to ports in elongated member 14. Primarily, this embodiment has been disclosed to make it clear that fluid for registering a sheet located in the sleeve need not be supplied through the open end of the sleeve.

Referring to FIGS. 4 and 7, it may be seen that the registration apparatus shown in FIG. 7 differs from that shown in FIG. 4 only in that elongated member 13 includes projections 40 and 41 tangentially aligned with an X axis, and the stop member includes a projection 42 tangentially aligned with a Y axis. These projections minimize the need for precise orthogonal alignment between the stop 19 and the elongated member 13 required to register a rectangular document. Alternatively, the projections improve registration when minor irregularities are present in documents supplied for registration.

Figure 8:
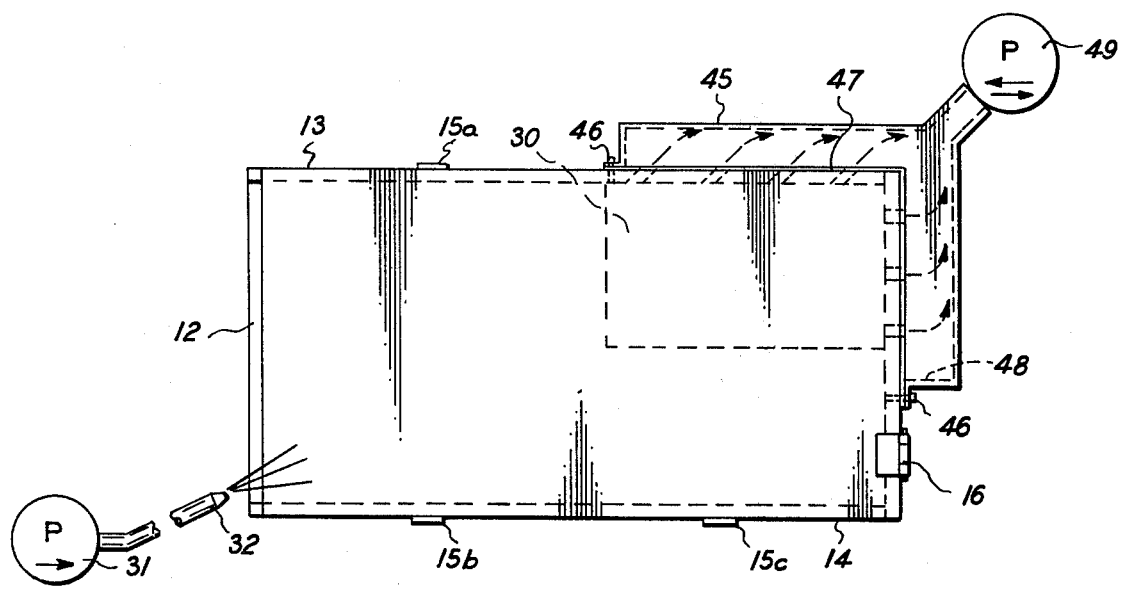
FIG. 8 is a schematic and top plan view of still another embodiment of fluidic registration apparatus, according to the invention, a sheet being shown in a sleeve of the apparatus in a registered position.
Figure 9:
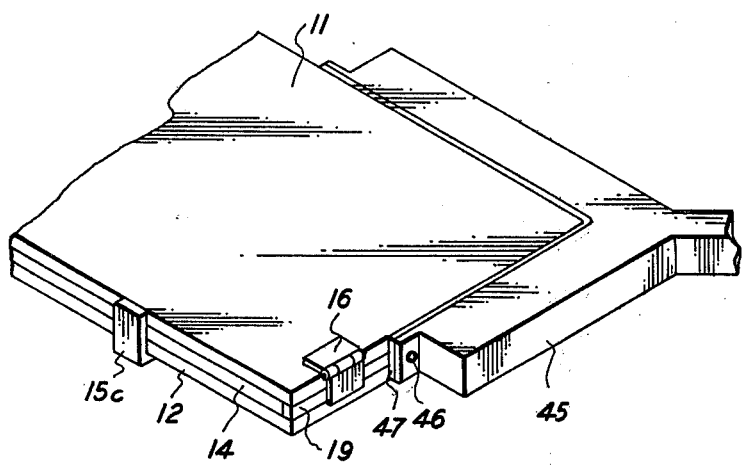
FIG. 9 is a partial perspective view of the sleeve shown in FIG. 8.

Referring to FIGS. 4, 8, and 9, it may be seen that the registration apparatus disclosed in FIGS. 8 and 9 differs from that shown in FIG. 3 in that a manifold 45 is fastened with screws 46 to the elongated member 13 and stop 19 and hole 75, nozzle 76 and pump 77 are removed. A gasket 47 is interposed between the manifold 45 and the sleeve to prevent fluid leakage. The ports 25–28 in the elongated member and ports 21–23 in the stop communicate with a chamber 48 in the manifold, and the chamber in the manifold communicates with a reversible pump 49. With this arrangement, the flow of fluid through the sleeve may be accelerated to more rapidly register documents inserted through the open end of the sleeve. If desired, the pump 31 and nozzle 32 may be dispensed with, and the document may be registered and discharged with the reversible pump 49. Thus, it may be seen that document 30 may be registered with a pressure pump, with a vacuum pump, or with both.

Figure 10:
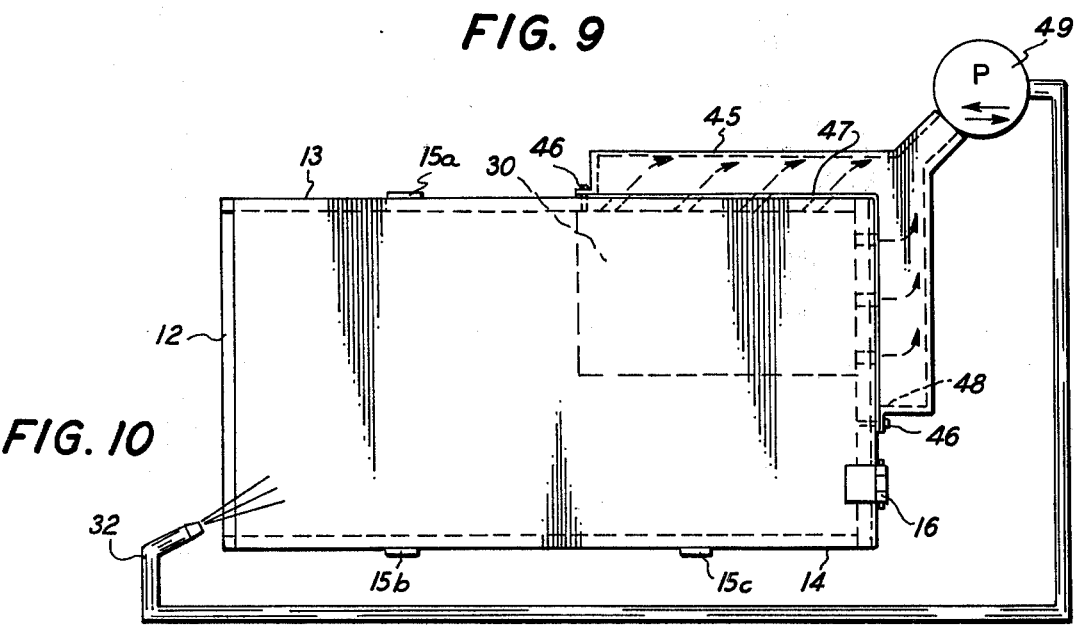
FIG. 10 is a schematic and top plan view of yet another embodiment of fluidic registration apparatus, according to the invention, a sheet being shown in a sleeve of the apparatus in a registered position.

Referring to FIGS. 8 and 10, it may be seen that FIG. 10 shows apparatus which differs from that which is shown in FIG. 8 only in that the pump 31 has been removed and reversible pump 49 is coupled to the nozzle 32 and manifold 45. The reversible pump may be used to rapidly move a document inserted into the sleeve into registration and to rapidly move a registered document out through the open end of the sleeve. In this connection, it should be appreciated that the term reversible pump may include apparatus having a valve arrangement which may be operated manually or automatically.

While generally rectangular sleeves have been shown and described, it should be understood that plates 11 and 12 and members 13 and 14 may be arcuate to provide an arcuate sleeve in which a document may be registered along an X axis and a perpendicularly disposed imaginary plane. Such a sleeve would be useful with optic systems, such as are used in xerographic apparatus, which require that an object be located on an arcuate surface. In addition, rectangular sleeves may be provided wherein the stop 19 is replaced by a retractable gate, such as is shown in U.S. patent application Ser. No. 627,570, A Registration Station, filed on Oct. 31, 1975, on an invention by Klaus K. Stange, et al., the application being assigned to the assignee herein, Xerox Corporation, and the contents of which should be considered to be incorporated herein. When a retractable gate is used, documents are discharged through the end where stop 19 has been shown and tray 8 must be repositioned to catch ejected documents.

It is to be understood that the description herein of preferred embodiments, according to the invention, have been set forth as examples thereof and are not to be construed or interpreted as limitations on the claims which follow and define the invention.

What is claimed is:

1. Apparatus for posing documents at a station, posed documents being registered with respect to an imaginary plane and an axis perpendicular thereto, comprising
    a. means for feeding documents: b. fluidic means for receiving and registering said documents at the station, the fluidic means including: a sleeve for internally accommodating said documents, at least a plurality of points on an inner narrow wall of the sleeve being located on the imaginary plane, a stop having at least one point aligned with the axis, and means, including at least one port in said stop and at least one port in said narrow wall, for providing in the sleeve a first fluid stream having velocity components normal to the imaginary plane and axis; and
    c. means for collecting discharged documents.

2. Apparatus as defined in claim 1 wherein said fluidic means include means for providing a second fluid stream in the sleeve for discharging registered documents, said first and second streams being present in the sleeve alternatively.

3. Apparatus as defined in claim 1 wherein said means for providing a fluid includes a fluid source for injecting fluid into the sleeve.

4. Apparatus as defined in claim 3 wherein said means for providing a fluid includes a manifold coupled to at least one of the ports and a pump for discharging fluid from the manifold.

5. Apparatus as defined in claim 4 wherein said fluid source includes apparatus for directing fluid under pressure, and said apparatus is coupled to said pump.

6. Apparatus as defined in claim 5 wherein said pump is reversible.

7. Apparatus as defined in claim 1 wherein said sleeve includes a pivotally mounted top plate and a translucent bottom plate.

8. Apparatus as defined in claim 7 wherein said means for providing a fluid includes a fluid source for injecting fluid into the sleeve at its other end.

9. Apparatus as defined in claim 7 wherein said means for providing a fluid includes a manifold coupled to at least one of the ports and a pump for discharging fluid from the manifold.

10. Apparatus for posing documents at a station in a sleeve, comprising:
    a. means for serially feeding documents from a stack of documents;
    b. fluidic means for serially moving documents in a first direction into registration at the station and for subsequently moving registered documents in an opposite direction;
    c. means for collecting documents; and d. means, adjacent to the sleeve, for engaging documents moved out of registration and moving engaged documents into said means for collecting documents, the rate at which documents are fed being long enough to allow engagement of a document moved out of registration before the next serially delivered document is moved into the sleeve, whereby at least a part of two documents can be present in overlapping relationship in the sleeve at the same time.

11. Apparatus as defined in claim 10 wherein said documents are registered with respect to an imaginary plane parallel to said first direction and an axis perpendicular to the plane, wherein at least a plurality of points on an inner narrow wall of the sleeve are located on the imaginary plane; wherein the sleeve includes a stop having at least one point aligned with the axis; and wherein the fluidic means includes means for providing in the sleeve a first fluid stream having velocity components normal to the imaginary plane and axis.

12. Apparatus as defined in claim 11 wherein said fluidic means include means for providing a second fluid stream in the sleeve for moving documents in said opposite direction; wherein said means for serially feeding documents includes at least one roller pair; and wherein said means for engaging documents cooperates with said means for serially feeding documents.

* * * * *